(12) United States Patent
Davis et al.

(10) Patent No.: US 7,752,224 B2
(45) Date of Patent: Jul. 6, 2010

(54) PROGRAMMABILITY FOR XML DATA STORE FOR DOCUMENTS

(75) Inventors: Tristan A. Davis, Redmond, WA (US);
Ali Taleghani, Redmond, WA (US);
Brian M. Jones, Redmond, WA (US);
Marcin Sawicki, Kirkland, WA (US);
Robert A. Little, Redmond, WA (US);
Alnur Ali, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/331,586

(22) Filed: Jan. 13, 2006

(65) Prior Publication Data
US 2006/0195413 A1 Aug. 31, 2006

Related U.S. Application Data

(63) Continuation-in-part of application No. 11/066,117, filed on Feb. 25, 2005, now Pat. No. 7,668,873.

(60) Provisional application No. 60/715,886, filed on Sep. 9, 2005.

(51) Int. Cl.
*G06F 17/30* (2006.01)
(52) U.S. Cl. .................. 707/793; 707/794; 707/795; 715/234; 715/235; 715/236
(58) Field of Classification Search .................. None
See application file for complete search history.

(56) References Cited

U.S. PATENT DOCUMENTS 5,287,504 A 2/1994 Carpenter et al. .......... 707/201
5,440,745 A * 8/1995 Platte et al. ............... 718/101
5,630,131 A 5/1997 Palevich et al. ............ 717/108

(Continued)

FOREIGN PATENT DOCUMENTS

KR 2004-0020933 A 3/2004

(Continued)

OTHER PUBLICATIONS

Leslie, "Using Javadoc and XML to Produce API Reference Documentation", SIGDOC' 02, Oct. 23, 2002, ACM Press, p. 104-109.*

(Continued)

*Primary Examiner*—Khanh B Pham
(74) *Attorney, Agent, or Firm*—Merchant & Gould, P.C.

(57) ABSTRACT

A programmability mode for interacting with data stores within a document allows real time interaction. Data for structuring information associated with a document, such as document metadata, is maintained in the data store where relationships between different pieces of data are maintained in a location distinct from the surface level view of a document. The data store exposes interfaces to the various pieces of data in the data store for allowing different applications to access and operate on one or more of the data pieces. The pieces of data may be structured according to a markup language such as the Extensible Markup Language (XML), and XML schemas may be associated with each piece of data for allowing the data store to validate the structure applied to the data based on an XML schema associated with a given piece of data.

16 Claims, 5 Drawing Sheets

U.S. PATENT DOCUMENTS

| | | | |
|---|---|---|---|
| 5,715,415 A | 2/1998 | Dazey et al. | 715/708 |
| 5,717,741 A * | 2/1998 | Yue et al. | 379/88.12 |
| 5,787,449 A | 7/1998 | Vulpe et al. | 715/203 |
| 5,845,299 A | 12/1998 | Arora et al. | 715/209 |
| 5,903,902 A | 5/1999 | Orr et al. | 715/202 |
| 5,910,075 A | 6/1999 | Arnell et al. | 49/25 |
| 5,911,068 A | 6/1999 | Zimmerman et al. | 719/328 |
| 5,974,430 A | 10/1999 | Mutschler et al. | 715/505 |
| 5,991,878 A | 11/1999 | McDonough et al. | 726/9 |
| 6,006,239 A | 12/1999 | Bhansali et al. | 707/201 |
| 6,014,677 A | 1/2000 | Hayashi et al. | 707/104.1 |
| 6,088,431 A * | 7/2000 | LaDue | 379/114.2 |
| 6,157,940 A * | 12/2000 | Marullo et al. | 703/27 |
| 6,247,020 B1 | 6/2001 | Minard | 707/104.1 |
| 6,268,851 B1 | 7/2001 | Bricklin et al. | 715/744 |
| 6,275,824 B1 | 8/2001 | O'Flaherty et al. | 707/9 |
| 6,317,777 B1 | 11/2001 | Skarbo et al. | 709/204 |
| 6,397,351 B1 | 5/2002 | Miller et al. | 714/13 |
| 6,457,002 B1 | 9/2002 | Beattie et al. | 707/3 |
| 6,490,601 B1 | 12/2002 | Markus et al. | 715/507 |
| 6,507,856 B1 | 1/2003 | Chen et al. | 715/205 |
| 6,562,076 B2 | 5/2003 | Edwards et al. | 715/229 |
| 6,571,253 B1 | 5/2003 | Thompson et al. | 707/103 R |
| 6,629,843 B1 | 10/2003 | Bunting et al. | 434/118 |
| 6,731,314 B1 | 5/2004 | Cheng et al. | 715/848 |
| 6,859,821 B1 | 2/2005 | Ozzie et al. | 709/205 |
| 6,865,599 B2 | 3/2005 | Zhang | 709/218 |
| 6,915,482 B2 | 7/2005 | Jellum et al. | 715/234 |
| 6,920,455 B1 | 7/2005 | Weschler | 707/100 |
| 6,944,622 B1 * | 9/2005 | Mitchell et al. | 707/102 |
| 6,944,662 B2 * | 9/2005 | Devine et al. | 709/225 |
| 6,950,990 B2 | 9/2005 | Rajarajan et al. | 715/736 |
| 6,996,769 B1 * | 2/2006 | Peikes et al. | 715/512 |
| 7,017,112 B2 | 3/2006 | Collie et al. | 715/513 |
| 7,035,839 B1 | 4/2006 | Gillespie et al. | 707/2 |
| 7,039,708 B1 * | 5/2006 | Knobl et al. | 709/227 |
| 7,039,863 B1 | 5/2006 | Caro et al. | 715/530 |
| 7,085,773 B2 * | 8/2006 | Dorsett, Jr. | 707/104.1 |
| 7,111,284 B2 * | 9/2006 | Takagi et al. | 707/E17.006 |
| 7,117,504 B2 | 10/2006 | Smith et al. | 719/328 |
| 7,200,816 B2 | 4/2007 | Falk et al. | 715/762 |
| 7,237,002 B1 | 6/2007 | Estrada et al. | 709/203 |
| 7,340,481 B1 | 3/2008 | Baer et al. | 707/104.1 |
| 7,386,563 B1 * | 6/2008 | Pal | 707/102 |
| 7,509,305 B2 * | 3/2009 | Tozawa et al. | 707/3 |
| 7,562,342 B2 | 7/2009 | Berg et al. | 717/108 |
| 2001/0056463 A1 | 12/2001 | Grady et al. | 709/203 |
| 2002/0010716 A1 | 1/2002 | McCartney et al. | 707/517 |
| 2002/0013792 A1 | 1/2002 | Imielinski et al. | 707/523 |
| 2002/0065110 A1 * | 5/2002 | Enns et al. | 455/566 |
| 2002/0085020 A1 | 7/2002 | Carroll, Jr. | 345/700 |
| 2002/0107867 A1 * | 8/2002 | Takagi et al. | 707/102 |
| 2002/0133516 A1 | 9/2002 | Davis et al. | 707/513 |
| 2002/0161801 A1 | 10/2002 | Hind et al. | 707/513 |
| 2002/0198962 A1 | 12/2002 | Horn et al. | 709/218 |
| 2003/0007009 A1 | 1/2003 | Haley | 345/805 |
| 2003/0018666 A1 | 1/2003 | Chen et al. | 707/513 |
| 2003/0018714 A1 | 1/2003 | Mikhailov et al. | 709/203 |
| 2003/0023632 A1 | 1/2003 | Ries et al. | 707/513 |
| 2003/0023953 A1 | 1/2003 | Lucassen et al. | 717/106 |
| 2003/0051054 A1 | 3/2003 | Redlich et al. | 709/246 |
| 2003/0097457 A1 | 5/2003 | Saran et al. | 709/230 |
| 2003/0159111 A1 | 8/2003 | Fry | 715/513 |
| 2003/0163603 A1 | 8/2003 | Fry et al. | 709/328 |
| 2003/0164859 A1 | 9/2003 | Evans | 345/792 |
| 2003/0174162 A1 | 9/2003 | Wu | 345/736 |
| 2004/0021679 A1 | 2/2004 | Chapman et al. | 345/700 |
| 2004/0073565 A1 * | 4/2004 | Kaufman et al. | 707/101 |
| 2004/0088332 A1 | 5/2004 | Lee et al. | 707/200 |
| 2004/0088647 A1 | 5/2004 | Miller et al. | 715/500 |
| 2004/0098667 A1 | 5/2004 | Atkinson | 715/513 |
| 2004/0103147 A1 | 5/2004 | Flesher et al. | 709/204 |
| 2004/0111672 A1 | 6/2004 | Bowman et al. | 715/513 |
| 2004/0153467 A1 | 8/2004 | Conover et al. | 707/100 |
| 2004/0183830 A1 | 9/2004 | Cody et al. | 715/747 |
| 2004/0199876 A1 * | 10/2004 | Ethier et al. | 715/523 |
| 2004/0205565 A1 | 10/2004 | Gupta | 715/513 |
| 2004/0205653 A1 | 10/2004 | Hadfield et al. | 715/530 |
| 2004/0217985 A9 | 11/2004 | Ries et al. | 715/740 |
| 2004/0220926 A1 | 11/2004 | Lamkin et al. | 707/3 |
| 2004/0225958 A1 * | 11/2004 | Halpert et al. | 715/513 |
| 2004/0237036 A1 * | 11/2004 | Qulst et al. | 715/513 |
| 2004/0243938 A1 | 12/2004 | Weise et al. | 715/526 |
| 2004/0268240 A1 * | 12/2004 | Vincent, III | 715/513 |
| 2005/0014494 A1 | 1/2005 | Owen et al. | 455/419 |
| 2005/0027618 A1 | 2/2005 | Zucker et al. | 705/26 |
| 2005/0033667 A1 * | 2/2005 | Sugimoto et al. | 705/28 |
| 2005/0033766 A1 * | 2/2005 | Pang et al. | 707/104.1 |
| 2005/0034079 A1 | 2/2005 | Gunasekar et al. | 715/753 |
| 2005/0044145 A1 | 2/2005 | Quinn et al. | 709/205 |
| 2005/0050066 A1 * | 3/2005 | Hughes | 707/100 |
| 2005/0068913 A1 | 3/2005 | Tan et al. | 370/310 |
| 2005/0071477 A1 | 3/2005 | Evans et al. | 709/228 |
| 2005/0076295 A1 | 4/2005 | Simske et al. | 715/517 |
| 2005/0086384 A1 | 4/2005 | Ernst | 709/248 |
| 2005/0091346 A1 | 4/2005 | Krishnaswami et al. | 709/220 |
| 2005/0091576 A1 | 4/2005 | Relyea et al. | 715/502 |
| 2005/0114771 A1 * | 5/2005 | Piehler et al. | 715/536 |
| 2005/0154978 A1 | 7/2005 | Albornoz et al. | 715/513 |
| 2005/0183001 A1 | 8/2005 | Carter et al. | 715/501.1 |
| 2005/0187973 A1 | 8/2005 | Brychell et al. | |
| 2005/0188349 A1 | 8/2005 | Bent et al. | 717/106 |
| 2005/0188350 A1 | 8/2005 | Bent et al. | 717/106 |
| 2005/0289457 A1 | 12/2005 | Obasanjo et al. | 715/513 |
| 2006/0031755 A1 * | 2/2006 | Kashi | 715/512 |
| 2006/0036692 A1 | 2/2006 | Morinigo et al. | 709/206 |
| 2006/0041558 A1 * | 2/2006 | McCauley et al. | 707/10 |
| 2006/0048112 A1 | 3/2006 | Thiagarajan et al. | 717/144 |
| 2006/0053158 A1 * | 3/2006 | Hall et al. | 707/102 |
| 2006/0053194 A1 | 3/2006 | Schneider et al. | 709/204 |
| 2006/0069987 A1 | 3/2006 | Jones et al. | 715/520 |
| 2006/0069989 A1 | 3/2006 | Jones et al. | 715/526 |
| 2006/0080590 A1 | 4/2006 | Jones et al. | 715/500 |
| 2006/0136441 A1 | 6/2006 | Fujisaki | 707/101 |
| 2006/0150085 A1 | 7/2006 | Davis et al. | 715/513 |
| 2006/0195777 A1 | 8/2006 | Davis et al. | 715/500 |
| 2006/0195783 A1 | 8/2006 | Davis et al. | 715/513 |
| 2006/0282452 A1 * | 12/2006 | Takagi et al. | 707/101 |
| 2007/0061382 A1 * | 3/2007 | Davis et al. | 707/201 |
| 2007/0118554 A1 | 5/2007 | Chang et al. | 707/102 |

FOREIGN PATENT DOCUMENTS

| | | |
|---|---|---|
| KR | 2004-0034327 A | 4/2004 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95155 A2 | 12/2001 |
| WO | WO 01/95155 A3 | 12/2001 |

OTHER PUBLICATIONS

Ladd et al., "Using HTML 4, XML and Java 1.2", Dec. 1998, Que, Platinum Edition, p. 693-701.*

Narravula et al, "Supporting Strong Coherency for Active Caches in Multi-Tier Data-Centers over InfiniBand", 2004, ANL.gov, p. 1-10, <Retrieved from CiteseerX May 5, 2009>.*

Narravula et al, "Designing Efficient Cooperative Caching Schemes for Multi-Tier Data-Centers over RDMA-enabled Networks", June 205, OCU-CISRC-6/05-TR39, P. cover p. 1-10, <Retrieved from internet May 5, 2009>.*

Memorandum and four figures regarding StarOffice 5.1; date is unknown, but believed to be earlier than Jan. 5, 2001, 5 pp.

Habraken, Jr., StarOffice 5.2 Calc Handbook, Prentice Hall, Dec. 2000, Chapter 2, 5 pp.
Comai et al., "Computing Graphical Queries Over XML Data", ACM Transactions on Information Systems TOIS, Oct. 2001, ACM Press, vol. 19 No. 4, 371-430 pp.
Sun et al., "Operational Transformation for Collaborative Word Processing", Proceedings of the Conference of CSCW'04, Nov. 10, 2004, ACM Press, p. 437-446.
Altova, "xmlspy5: User & Reference Manual", Jan. 3, 2003, www.altova.com, pp. 13-30, 698-701, 890.
McKenzie et al., "XFA Template Version 1.0", http://www.w3.org/1999/05/XFA/xfa-template, retrieved on May 30, 2008, 60 pp.
Heslop et al., "Word 2003 Bible", Wiley Publishing, 2003, pp. 441-443.
Souchon et al., "A Review of XML-compliant User-Interface Description Languages," LNCS, copyright Springer-Verlag 2003, pp. 377-391.
Meyer, "A Tool-Creating Validated XML Documents on the Fly Using MS Word," SIGDOC, copyright Oct. 2002, ACM, pp. 113-121.
Sun_Micro, How to Write Doc Comments for the Javadoc Tool, Sep. 2004, pp. 1-16.
Sala, et al., ML 3.0 Smoothed Aggregation User's Guide, Computational Math and Algorithms, Sandia Notational Laboratories, May 2004, pp. 3-66.
Official Action in U.S. Appl. No. 10/955,612 dated Sep. 19, 2006.
Official Action in U.S. Appl. No. 11/030,423 dated Nov. 22, 2006.
Official Action in U.S. Appl. No. 11/030,423 dated May 15, 2007.
Official Action in U.S. Appl. No. 10/955,612 dated May 18, 2007.
Official Action in U.S. Appl. No. 11/066,083 dated Jun. 4, 2007.
Official Action in U.S. Appl. No. 11/066,117 dated Jun. 21, 2007.
Official Action in U.S. Appl. No. 11/067,383 dated Jun. 28, 2007.
Official Action in U.S. Appl. No. 11/030,423 dated Oct. 4, 2007.
Official Action in U.S. Appl. No. 11/332,468 dated Dec. 17, 2007.
Official Action in U.S. Appl. No. 11/066,117 dated Feb. 15, 2008.
Official Action in U.S. Appl. No. 10/955,612 dated Mar. 10, 2008.
Official Action in U.S. Appl. No. 11/066,083 dated Mar. 11, 2008.
Official Action in U.S. Appl. No. 11/065,754 dated Jun. 13, 2008.
Official Action in U.S. Appl. No. 11/030,423 dated Jul. 10, 2008.
Official Action in U.S. Appl. No. 11/332,468 dated Jul. 18, 2008.
Official Action in U.S. Appl. No. 11/066,058 dated Oct. 1, 2008.
Official Action in U.S. Appl. No. 11/066,117 dated Oct. 14, 2008.
Official Action in U.S. Appl. No. 10/955,612 dated Dec. 3, 2008.
Official Action in U.S. Appl. No. 11/066,083 dated Dec. 9, 2008.
Official Action in U.S. Appl. No. 11/065,754 dated Jan. 22, 2009.
Official Action in U.S. Appl. No. 11/030,423 dated Feb. 18, 2009.
Official Action in U.S. Appl. No. 11/332,468 dated Mar. 11, 2009.
PCT Search Report dated Mar. 12, 2007 in PCT/US2006/034974.
European Search Report dated Mar. 31, 2006 in EP 06100594.8.
European Search Report dated Dec. 19, 2007 in EP 05112126.7.
European Search Report dated Dec. 19, 2007 in EP 05112131.7.
European Examination Report dated Mar. 3, 2008 in EP 05112126.7.
European Examination Report dated Mar. 3, 2008 in EP 05112131.7.
European Search Report dated Jun. 12, 2008 in EP 05105427.8.
Chinese First Office Action dated May 9, 2008 in 200500885148.
Chinese First Office Action dated Jul. 4, 2008 in 200510128896.2.
Chinese First Office Action dated Aug. 29, 2008 in 200510128895.8.
Chinese Second Office Action dated Nov. 21, 2008 in 200510088514.8.
Chinese First Office Action dated Nov. 7, 2008 in 200610007194.3.
Official Action in U.S. Appl. No. 11/066,177 dated Apr. 8, 2009.
Official Action in U.S. Appl. No. 11/066,058 dated Apr. 13, 2009.
Official Action in U.S. Appl. No. 10/955,612 dated Jun. 25, 2009.
Official Action in U.S. Appl. No. 11/065,754 dated Jul. 8, 2009.
European Communication dated May 13, 2009 in EP 05105427.8.
Chinese Third Office Action dated Jun. 5, 2009 in 200510088514.8.
Bodart et al., "Architecture Elements for Highly-Interactive Business-Oriented Applications", Lecture Notes in Computer Science, Springer Berlin/Heidelberg, vol. 753/1993, copyright 1993, pp. 83-104.
Official Action in U.S. Appl. No. 10/955,612 dated Nov. 12, 2009.
Chinese Second Office Action dated Nov. 13, 2009 in 200510128895.8.
Mascolo et al., "XMiddle a Data-Sharing Middleware for Mobile Computing", Wireless Personal Communications, Springer, Dordrecht, NL, vol. 21, No. 1, Apr. 1, 2002, pp. 77-103.
Official Action in U.S. Appl. No. 11/066,058 mailed Sep. 24, 2009.
Official Action in U.S. Appl. No. 11/030,423 dated Sep. 25, 2009.
Official Action in U.S. Appl. No. 11/066,083 dated Oct. 6, 2009.
Official Action in U.S. Appl. No. 11/332,468 dated Oct. 20, 2009.
European Search Report dated Oct. 6, 2009 in EP 06824911.9-1225.
Chinese First Office Action dated Jul. 24, 2009 in 200680033069.8.
Chinese First Office Action dated Aug. 28, 2009 in 200680033162.9.

* cited by examiner

PROGRAMMABILITY FOR XML DATA STORE FOR DOCUMENTS

RELATED APPLICATIONS

This utility patent application is a continuation-in-part of U.S. patent application Ser. No. 11/066,117 filed Feb. 25, 2005, and claims the benefit of the earlier filing date under 35 U.S.C. §120, which is hereby incorporated by reference in its entirety, and also claims the benefit under 35 United States Code §19(e) of U.S. Provisional Patent Application No. 60/715,886 filed on Sep. 9, 2005, which is hereby incorporated by reference in its entirety.

BACKGROUND

Computer users have grown accustomed to user-friendly software applications that help them write, calculate, organize, prepare presentations, send and receive electronic mail, make music, and the like. For example, word processing applications allow users to prepare a variety of useful documents. Spreadsheet applications allow users to enter, manipulate, and organize data. Slide presentation applications allow users to create a variety of slide presentations containing text, pictures, data or other useful objects.

Documents created by such applications (e.g. word processing documents, spreadsheets, slide presentation documents), however, have limited facility for storing/transporting the contents of arbitrary metadata required by the context of the documents. For example, a solution built on top of a word processing document may require the storage of workflow data that describes various states of the document, for example, previous workflow approval states (dates, times, names), current approval states, future workflow states before completion, name and office address of document author, document changes, and the like. The options for storing this information are primarily limited to the use of document variables or existing custom object linking and embedding (OLE) document properties that have limitations. For example, no hierarchical data may be stored; character length is limited, and the like. The properties for such methods are stored in a single store, for example, an OLE properties store, which means the properties have a possibility of conflicting. Further, such stored properties have no data validation. It is difficult for users of such applications and related documents, to store arbitrary data with documents, which is a common need of many users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more data stores are maintained separately from a primary presentation storage within a document for storing, relating and for allowing use of arbitrary data that is associated with a computer-generated document. Data for structuring information associated with a document, such as document metadata, is maintained in a data store where relationships between different pieces of data are maintained. The data store exposes application programming interfaces (APIs) to the various pieces of data in the data store for allowing different applications to access and operate on one or more of the data pieces.

The pieces of data may be structured according to a markup language such as the Extensible Markup Language (XML). XML schemas may be associated with each piece of data, and the data store may validate the XML structure applied to the data based on an XML schema associated with a given piece of data. Programmatic access is provided to the data in its XML form while the document is being edited. Multiple client applications may access and edit the same piece of document data, and any conflicting changes to a given piece of data are resolved. Standard XML schemas (XSDs) may also be used to define the contents of any of the pieces of custom XML data associated with document metadata in order to ensure that XML data applied to the document data are valid.

DETAILED DESCRIPTION

Figure 1:
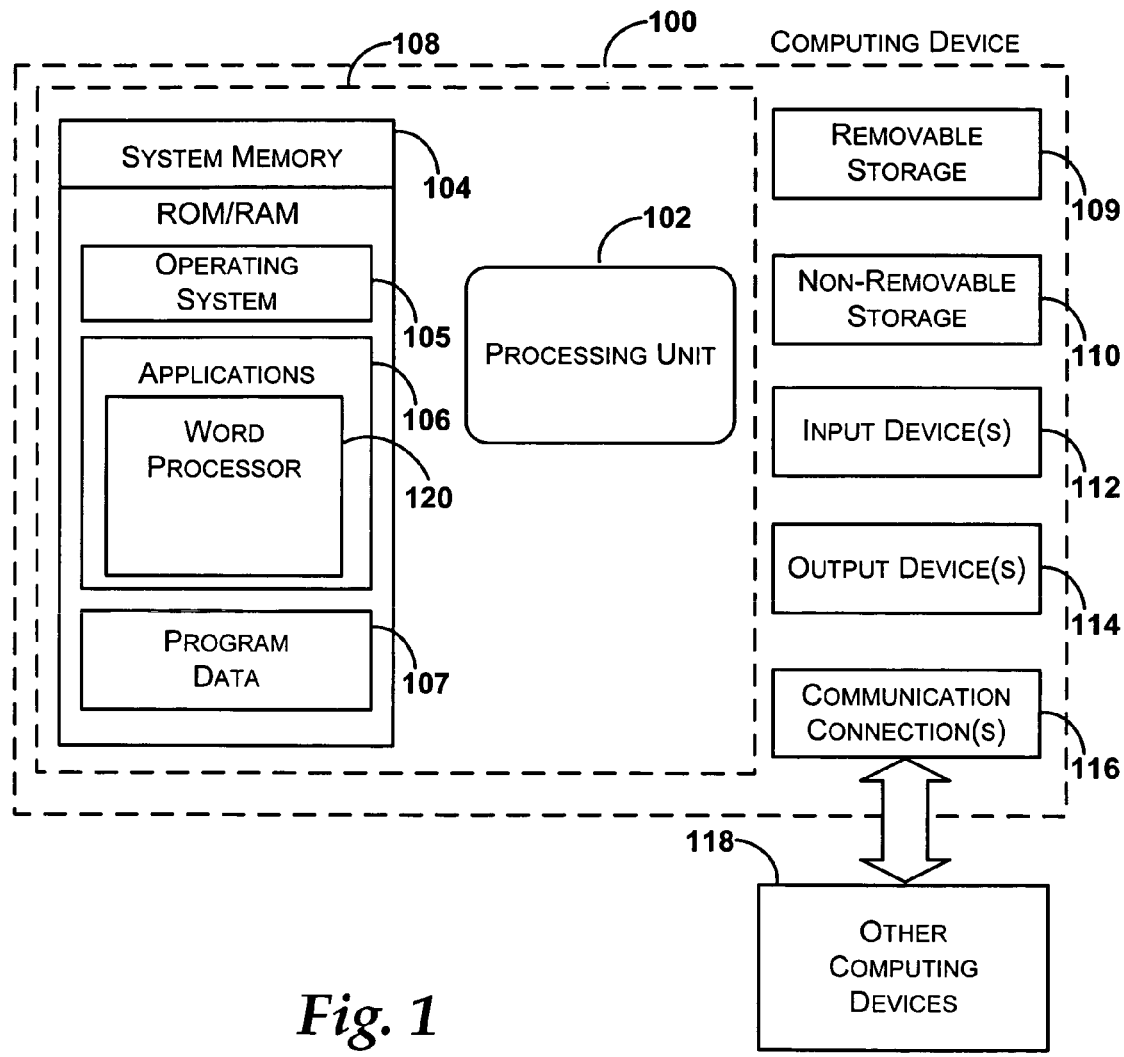
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS operating systems from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the WORD program from MICROSOFT Corporation. It should be appreciated, however, that word processor application programs from other manufacturers may be utilized. The illustration of a word processing application is for purposes of example only and is not limiting of other types of applications that may produce and operate on documents. For example, other application programs 106 which are capable of processing various forms of content (e.g. text, images, pictures, etc.), such as spreadsheet application programs, database application programs, slide presentation application programs, drawing or computer-aided application programs, etc. are equally applicable. An example application program 106 that produces and operates on a variety of different types of documents includes OFFICE from MICROSOFT Corporation.

Embodiments may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Throughout the specification and claims, the following terms take the meanings associated herein, unless the context of the term dictates otherwise.

The term "data" may refer to document surface level or presentation level information such as words, sentences, paragraphs and the like, as well as, supplementary information, for example, metadata, which is carried with, referred to, or used by the word processing document. This information is often large and is likely not exposed on the presentation layer of the document.

The term "presentation" refers to the visible portion of the document such as the text and layout that would appear if the document were printed.

The term "tag" refers to characters inserted in a document that delineates elements within an XML document. Each element generally includes two tags: the start tag and the end tag. It is possible to have an empty element (with no content) in which case one tag is allowed.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The term "building block" refers to a bounded and potentially labeled region in a document which serves as a container for a specific type of content entered by the user.

The term "data binding, data mapping, and data field" refer to a property on a building block which determines an XPath to the XML DOMs stored in the document where the contents of the building block should be stored.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

"XPath" is an operator that uses a pattern expression to identify nodes in an XML document. An XPath pattern is a slash-separated list of child element names that describe a path through the XML document. The pattern "selects" elements that match the path.

The term "XML data store or data store" refers to a container within a document, such as a word processor document, a spreadsheet document, a slide presentation document, etc., which provides access for storage and modification of the data (in XML format, for example) stored in the document while the file is open. Further definition of XML data store is provided below with respect to FIG. 2.

Figure 2:
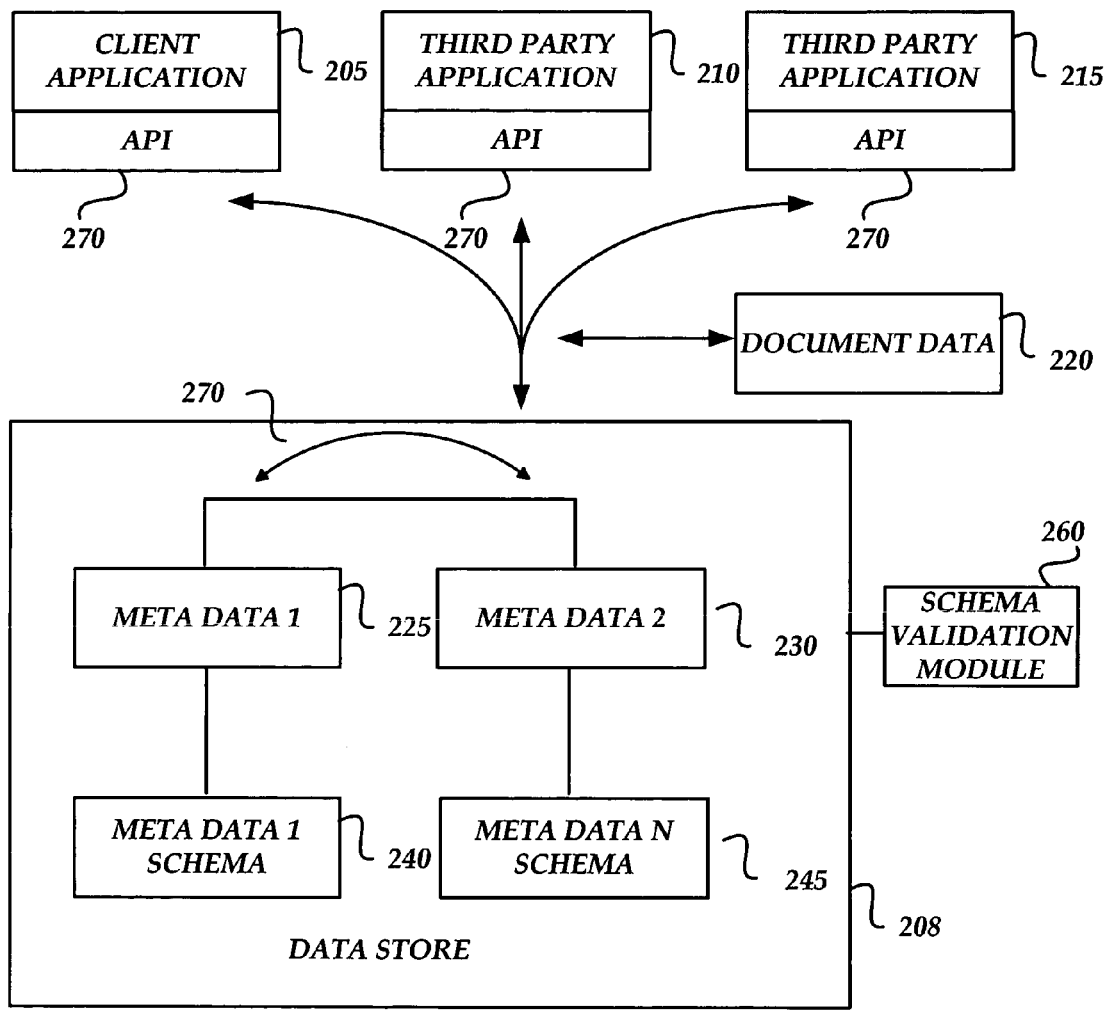
FIG. 2 is a block diagram illustrating a relationship between one or more client applications and one or more data store and the contents of the data store(s)

FIG. 2 is a block diagram illustrating a relationship between one or more client applications and one or more data stores and the contents of the data store(s). Generally described, one or more data stores are maintained separately from a primary presentation storage within a document for storing, relating and for allowing use of arbitrary data that is associated with a computer-generated document. Data for structuring information associated with a document, such as document metadata, is maintained in a data store where relationships between different pieces of data are maintained. The data store exposes application programming interfaces (APIs) to the various pieces of data in the data store for allowing different applications to access and operate on one or more of the data pieces. As used herein, the terms "data consumers," "applications" and "processes" may be used interchangeably unless the context clearly dictates otherwise.

The pieces of data may be structured according to a markup language such as the Extensible Markup Language (XML). XML schemas may be associated with each piece of data, and the data store may validate the XML structure applied to the data based on an XML schema associated with a given piece of data. The data stores may contain any number of arbitrary data items, for example metadata, structured according to the Extensible Markup Language (XML). Accordingly, document solution providers may store arbitrary metadata as XML with a given document and have that information processed by a given solution having access to the data upon the occurrence of an event such as when data is removed or loaded to the data store and/or when the document is opened/edited/saved by a user.

Programmatic access may also be provided to the data in its XML form while the document is being edited. According to one embodiment, a standard mechanism is provided that is familiar to solution developers via which the data may be accessed and modified programmatically while the document is open. This programmatic access mimics standard XML interfaces. Programmatic access to the data is provided via application programming interfaces to one or more editing client applications (for example, document editing or creating applications and/or third party application add-in solutions, and the like). Accordingly, multiple client applications may access and edit the same piece of document data, and any conflicting changes to a given piece of data are resolved. "Side effects" to any given change may be made (for example, in response to setting a company name to "Microsoft," changing a stock symbol to "MSFT"). In addition, changes to data and any associated side effects may be "bundled" by the data store so that undoing one or more changes reverses all related changes. This assists in removing the burden of development from the solution itself to ensure that it has reversed all changes when the user initiates an undo of the original change from the document surface, for example, by pressing an Undo command.

Standard XML schemas (XSDs) may also be used to define the contents of any of the pieces of custom XML data associated with document metadata in order to ensure that XML data applied to the document data are valid. These schemas may be attached to any instance of XML data stored in the document, and the data store will disallow any change to the XML data that would result in the XML structure (that is, the XML tags as opposed to their contents) of that data from becoming invalid. This helps to ensure that the solution developer can attach a specific piece of XML metadata to a document and ensure that the XML data will continue to be structurally "correct" according to the associated schema, regardless of which data consumers (for example, add-ins) are used to modify that data.

Referring now to FIG. 2, the document data 220 includes XML structure data and associated document data representing the surface or presentation level view of a document. For example the document data 220 may include XML structure (e.g., heading tags, body tags, conclusion tags) and associated surface view data (e.g., words, sentences, paragraphs) of a word processing document, spreadsheet document, slide presentation document, and the like.

The data store 208 is a document data repository for storing one or more pieces of structured data associated with one or more types of data associated with a given document. Although only one data store is illustrated, more than one data store may be utilized. The metadata1 225 (structured data item) may include XML structure data and associated data for a first piece of metadata associated with the document. For example, the metadata1 225 may include XML structure data (e.g., date tags, name tags, etc.) listing the document author, date of document creation, date of document last change/save, and the like. The metadata2 230 (structured data item) may include XML structure data (tags) and associated metadata representing a second piece of metadata associated with the document. As should be understood, the metadata1 and metadata2 are for purposes of example and are not limiting of the variety and number of different types of data that may be maintained in the data store 208 in association with a given document. For example, as described herein, arbitrary data may be structured and added to the document by one or more software applications as desired by solution providers or users having access to the document data.

A schema file 240, 245 may be optionally attached to each piece of data stored in the data store 208 for dictating the syntax and validation rules associated with Extensible Markup Language (XML) data applied to each piece of data 225, 230. XML schema files provide a way to describe and validate data in an XML environment. A schema file states what XML markup data, including elements and attributes, are used to describe content in an XML document, and the schema file defines XML markup syntax, including where each element is allowed, what types of content are allowed within an element and which elements can appear within other elements. The use of schema files ensures that the document (or individual piece of data in this case) is structured in a consistent and predictable manner. Schema files 240, 245 may be created by a user and generally supported by an associated markup language, such as XML.

This schematization of the document allows the data store to provide the ability to "guarantee" the structural validity of the document by rejecting any change that violates a given schema file at the data store level. According to an embodiment, the data store 208 utilizes a schema validation module 260 for validating XML structure added to or changes made to a given piece of data against an associated schema file. For example, if a document creator or editor makes XML structural changes to a given piece of data, for example, the metadata1, wherein the editor adds or removes a given XML tag, the data store 208 will utilize the schema validation module to check the XML structural changes against the associated schema file to ensure the validity of the change. If the change is not valid, an error can be generated to the editor. As is understood, such control of the XML structure applied to a given piece of data allows for structural consistency and predictability which is especially important for allowing client and third party applications to interact with associated data.

The data store 208 provides one or more application programming interfaces (API) 270 which can be accessed by client applications 205 (e.g., word processing applications, spreadsheet applications, slide presentation applications, etc.), as well as, third party applications 210, 215 via the object models (OM) of the respective applications 205, 210, 215. These APIs allow client applications and third party applications to load any existing XML file into a given document's data store 208, thus ensuring that that data is now part of the document and will travel within that document for its lifetime (e.g., through opening/editing/saving/renaming/etc.) or until the data is deleted from the data store. According to one embodiment, the data in the data store is available in its XML format even when a source application for a given piece of data 225, 230 is closed or is otherwise not available. That is, a given piece of data 225, 230 may be accessed via the APIs 270 by other applications (other than a source application). As described below, the APIs also allow client and third party applications to make changes to the XML markup data applied to the data items 225, 230.

Once XML data 225, 230 is loaded into the data store for association with a document 220, it can be manipulated as standard XML using the data store interfaces designed to provide similar methods to existing XML editing interfaces in order to leverage developers' existing knowledge of the XML programming standard. This allows users to perform standard XML operations on XML data added to the data store for a document, such as adding elements and attributes, removing elements and attributes, changing the value of existing elements/attributes, and reading the values of any existing part of the associated XML tree. Using these XML standard operations, solutions may store structured complex metadata with a document subject to none of the previous restrictions on the length/size of the data or structure of the data, which enables the use of this XML data store for significantly more structured solutions than prior solutions. For example, a third party application 215 may be written for locating and extracting document author names and document creation dates from a number of documents by reading the metadata1 225 added to the data store 208 for each document. The example third party application may be an application programmed for making a list of document author names and document creation dates for all documents created by a given organization. In accordance with embodiments of the present invention, the third party application may utilize the XML structure applied to the metadata1 for efficiently locating and extracting the desired data. For example, the third party application may be written to parse the XML structure of the metadata1 file to locate XML tags, such as <docauthor> and <doccreationdate> for obtaining and using data associated with those tags. As should be appreciated, the forgoing is just one example of the many ways one or more applications may interact with structured data that is associated with the document via the data store 208.

In addition, the data store 208 provides any number of API interfaces 270 to any individual piece of XML data 220, 225, 230 (also known as a store item) to enable multiple applications 205, 210, 215 to work with the same piece of data. For example, several solutions, such as a client application (e.g., word processing application) and third party application solutions (e.g., the application described above), may work with the same set of document properties (e.g., properties contained in the metadata2 230 file). Using the data store 208, each of these applications receives separate access to the desired XML data 230 through their own data store API interface 270 for allowing each application to communicate with the data via its own OM without having to deal with the complexity of having multiple data consumers accessing the same piece of data.

In order to allow for these multiple data consuming applications 205, 210, 215 to access the same data, the data store 208 notifies each of these applications when any part of the XML data is changed by another application so that a given application may respond to that change (both internally to its own process and externally by other changes to the same data). When one application requests a change to a given data item, that request is automatically sent to all other applications to allow other applications to decide how or if to respond to the requested change. According to one embodiment, this is accomplished by allowing each application to register to "listen" to any part of the XML data to which it has an interface so that a given application solution/program only receives those messages which are pertinent to its own logic. For example, one type of application 210 may wish to register to listen to all changes made to a given XML data in order to provide detailed business logic capabilities to a third party solution, but another type of application 215 may wish to only listen to changes to one or two specific XML elements within the same data because its logic does not care about changes to any other part of the XML data.

According to this embodiment, the multiple applications 205, 210, 215 may access and edit the same piece of document data, and any conflicting changes to a given piece of data are resolved. For example, "side effects" to any given change may be made when one change by one application causes a side effect change by another application. For example, a first application 210 may be tasked with extracting company names from one or more data items 225, 230 associated with a given document for translating those names into corresponding stock symbols, if available, for compiling a list of company stock symbols related to a given document. If a second application 215 causes a given company name in a given piece of metadata to be added or to be changed, for example, changing a company name from "Company ABC" to "Company XYZ," the first application may listen to this change for automatically updating its list of stock symbols to include the stock symbol for "Company XYZ" instead of "Company ABC." In addition, such changes and any associated side effects may be bundled by the data store 208 so that undoing one or more changes reverses all related changes.

Figure 3:
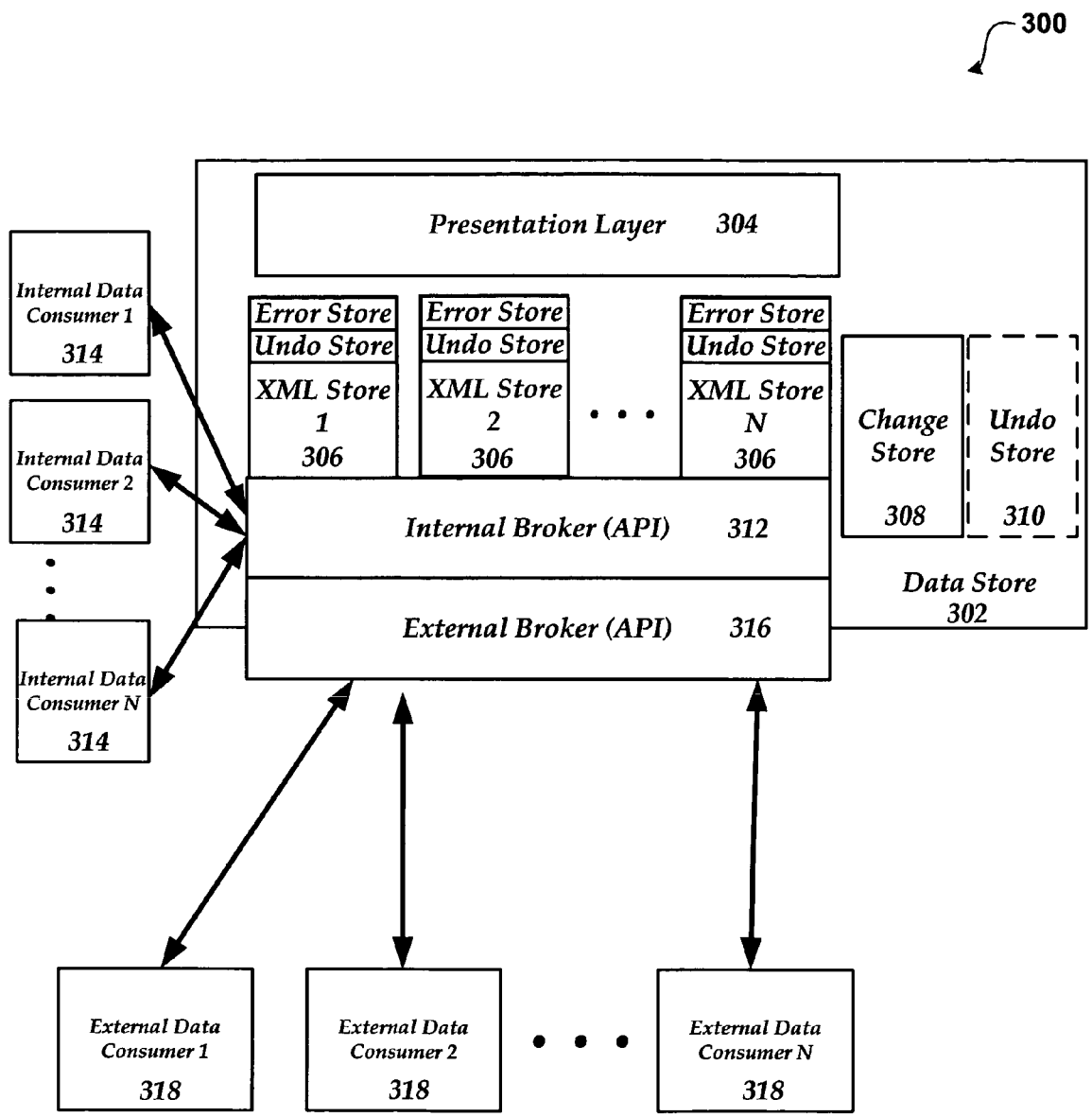
FIG. 3 illustrates a system diagram showing the interaction between the internal and external data consumers with the XML data stores.

FIG. 3 illustrates a system diagram showing the interaction between the internal and external data consumers with the XML data stores. As illustrated, system 300 includes a data store 302 including a presentation layer 304, XML stores 1-N (306) that each includes an error store and an undo store, a global change store 308, an optional global undo store 310, an internal broker 312 that is coupled to internal data consumers 1-N 314 and an external broker 316 that is coupled to external data consumers 1-N 318.

Using the XML Data Store(s) 306, documents have the ability to contain any number of arbitrary data items (as long as each conforms to standard XML syntax). Arbitrary metadata may be stored as XML within a document and that information may be automatically round-tripped when the document is opened/edited/saved by the user.

As discussed above, programmatic access to this data is provided via an API that may be utilized while the document is being edited, providing a standard mechanism familiar to solution developers via which this information can be accessed and modified programmatically while the document is open. According to one embodiment, this programmatic access is designed to mimic standard XML interfaces. Using the API, data can be added/removed while the application, such as a word processing application, is running; data can be populated within a store item (a part within the data store); data can be manipulated using standard XML constructs;

schemas can be associated with any arbitrary XML data in the data store; schemas can be added/removed/changed once associated with the data store item; and XML changes can be evented to any listening clients. As illustrated, the API comprises an external broker 316 that provides an interface for the external data consumers 318 and an internal broker 312 that provides an interface for any internal data consumers 314 that interact with the data store 302.

Manipulations to data store 302 may occur in real time. As discussed above, the data stores 306 may contain one or more types of data. For example, a company might have one data store that they're using to store all the different types of data they want to store within a single data store, while another company might want to store data different types of data across different data stores.

A data consumers 318 may register for events that relate to actions concerning the data stores 306. For example, a data consumer may register to receive an event when any type of change is made to one or more data stores. Another data consumer may register for changes that have happened to a certain element or set of elements within a data store. Common events include, loading a data store, adding to a data store and deleting from a data store. When the event occurs, each data consumer that has registered may react to the change while the state of the data stores is maintained consistently. Many times, a data consumer will not perform any actions when a change is made. At other times, the data consumer will perform some action(s) in response to the event. For example, a data consumer may make some other changes to the data store in response to the change such as, in response to a title change, updating headers within the document. The data consumer may also perform some other operations that do not affect the document. For example, if stock ticker symbol is inserted, the data consumer may retrieve data that is associated with that stock symbol even though all of the retrieved data may not be displayed within the document at the presentation layer. The data consumer may also reject the change. For example, if data consumer 1 receives a change they do not accept, that data consumer may return a flag to the broker indicating that the change is not accepted. Whenever a change is not accepted, the change is rolled back, along with any side effects, such that the change never occurred. Each XML store 306 may utilize its undo store to undo the changes it has made. Alternatively, the global undo store 310 may be utilized to undo the changes made across the data stores. Imagine there are three data consumers that are interested in what's happening to document properties, so each of these data consumers have registered to receive an event relating to a change of the properties. When a change is made, the data store determines each data consumer that has registered and informs each of them of the change in a predetermined order. Each data consumer, in turn, may perform some action in response to the change. If the change, or any of the changes made by the registered data consumers as a result of the change, are not accepted by any one of the data consumers, all of the changes relating to the initial change are undone.

The external broker application programming interface layer 316 provides access to the data store 302 by the external data consumers 318 and allows third-party clients to interact with the data store 302 just as the internal data consumers that are associated with the application interact with the data store. Each of the XML data stores 306 within the data store 302 are provided with a unique ID for identification purposes. This helps in locating the XML data stores 306.

At any point a data consumer may add a schema that is used to validate the data within a data store. So now any other third-party code that comes along and tries to change the data, the first thing that the data store will do is determine whether the change makes sense with the provided schema. Once a schema is attached, the broker becomes a validating object.

The data stores may also receive more than one element at a time. Providing the data (XML) as one particular stream may help satisfy the schema in some situations. For example, suppose that an attached schema says that if stock data exists it must have at least two companies. If the stock data were added one by one it would not be valid.

A single pass is used to validate the data. Instead of making two passes which can result in a change being made to the data store, the validation is performed before the data is committed to the data store. This helps to prevent a data consumer from introducing errors into the data store.

Figure 4:
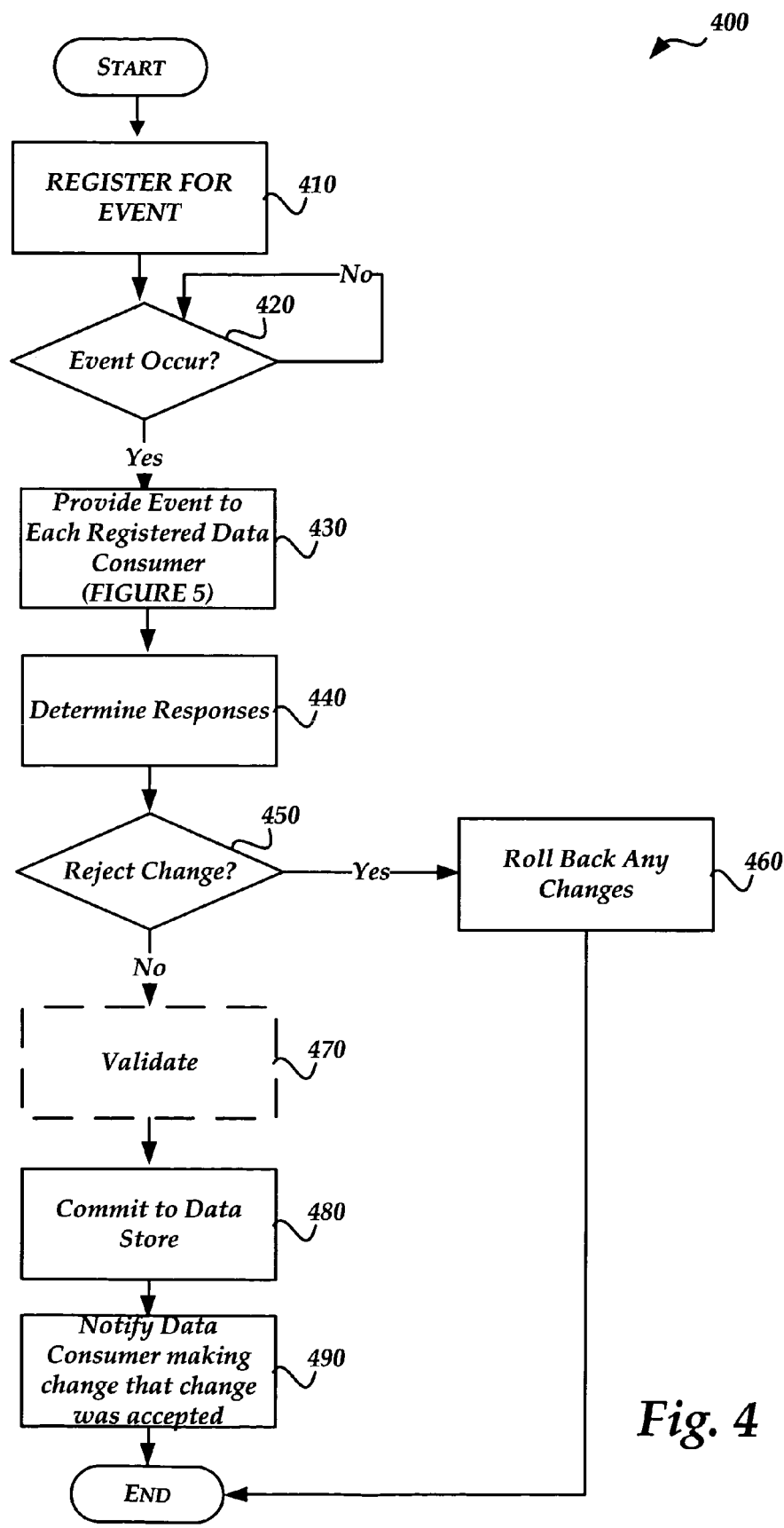
FIG. 4 illustrates a process for handling events that are associated with a data store.
Figure 5:
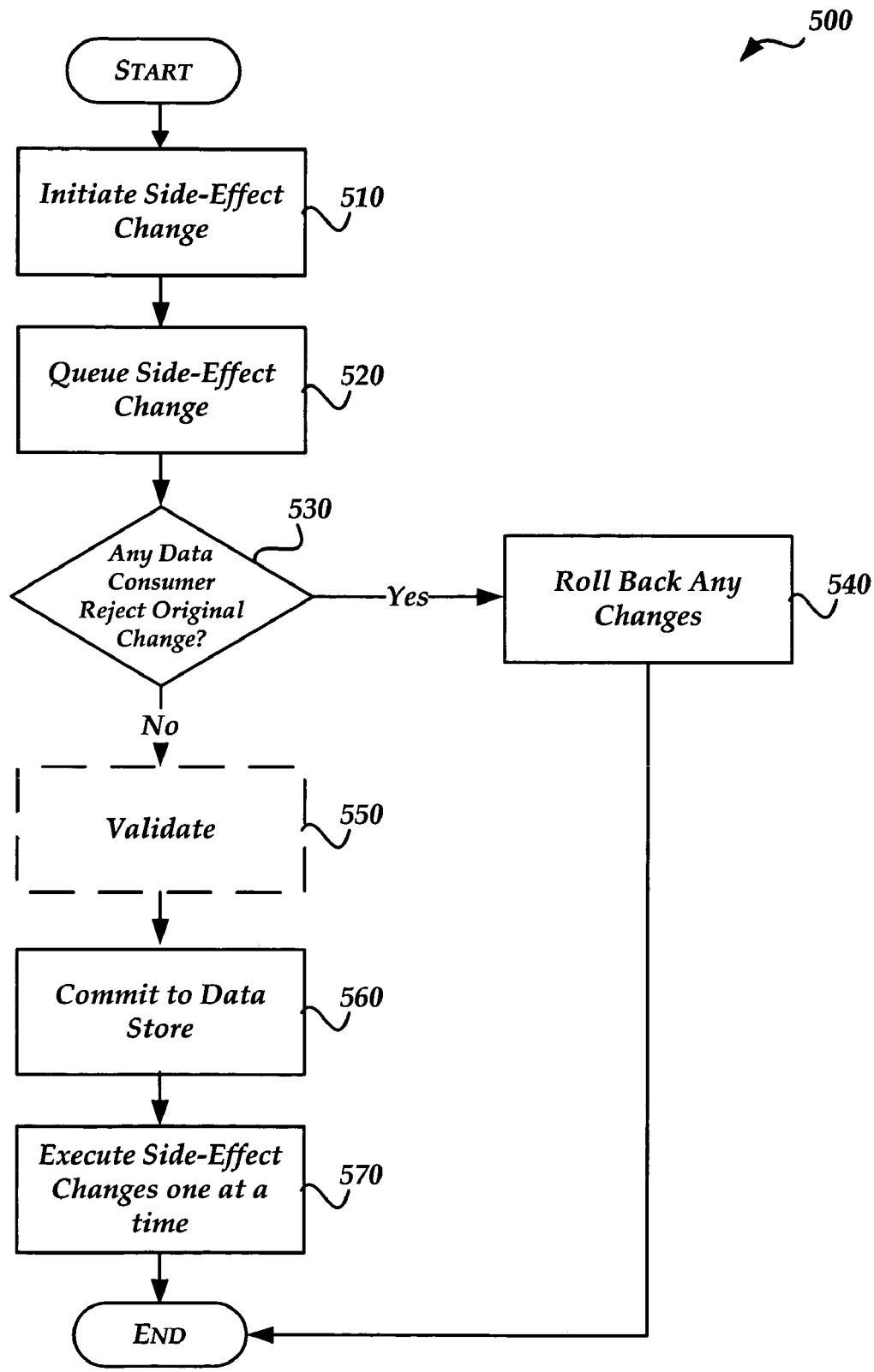
FIG. 5 illustrates a process for handling an event that includes side effects, in accordance with aspects of the present invention.

FIGS. 4 and 5 illustrate a process for handling events relating to a data store. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 4 illustrates a process for handling events that are associated with a data store. Generally, when the data store receives a change request from a data consumer, that change is sent to all of the registered data consumers to allow them to reject the change, or to request side-effects (other XML changes) as a result of the change.

After a start operation, the process flows to operation 410, where a data consumer registers for any event(s) that it is interested in receiving. The events may relate to adding data to the data store, removing data from the data store, making a change to data in the data store, and the like. The event may be attached to global changes or specific changes to elements that are stored within one or more of the data stores. For example, one data consumer may want to know when any change is made, whereas another client may only be interested in a change to one specific value within the data store.

Moving to decision operation 420, a determination is made as to whether an event has occurred. The event relates to a change to the data store. For example, as discussed above, the event may include adding, removing, or making some other change to the data store. For example, the change may be to add a node to the data store. When an event has not occurred, the process returns to decision operation 420. When an event has occurred, the process flows to operation 430.

At operation 430, the change is relayed to each of the data consumers that have registered for the change. According to one embodiment, each data consumer is notified in a predetermined order. For example, the order may be based on the order of registration of the data consumers.

Transitioning to operation 440, a response is obtained from each of the data consumers that have received the event notification. Each of the clients may accept or reject the change. The responses determine whether or not the change will be committed to the data store.

Moving to decision operation 450, a determination is made as to whether any of the data consumers rejected the change to the data store. When the change has been rejected by any of the data consumers, the process moves to block 460, where any changes that were made in response to the change are rolled back as if no change had ever taken place.

When all of the notified clients accept the change, the process flows to operation 470 where the change is optionally validated and then the process flows to operation 480 where the change is committed to the appropriate data store.

The original data consumer that initiated the change then receives notification that the change has been accepted (operation 490). The process then moves to an end block and returns to processing other actions.

FIG. 5 illustrates a process for handling an event that includes side effects. Generally, when the data store receives a change request from a data consumer, that change is sent to all of the registered clients to allow them to reject the change, or to request side-effects (other XML changes) as a result of the change. For example, a client may be informed of a change to one item within the data store and as a result of the change, the data consumer makes another change to the data store. When a change is requested as a side-effect, then the process is slightly different from the process illustrated in FIG. 4.

After a start operation, the process flows to operation 510, where a client initiates a side-effect change to the data store as a result of the change that is currently being accepted or rejected.

Transitioning to operation 520, this side-effect change is queued but not executed. In other words, the side-effect change does not immediately execute within the data store. Based on this fact, alternatives for the events include:

| | |
|---|---|
| Force node operations (e.g. add, replace) to return a void rather than a node and document that it's a request, not an action | Makes result of node operations consistent No performance hit Clear story for the fact that if you want to manipulate a node, you do so in it's AfterAdd event |
| Reflect the fact that caller is 'requesting' a change instead of making one | Makes result of node operations consistent No performance hit |
| Perform the necessary changes for each caller, then undo them when the caller returns | Return a live node to the caller |
| Return a disconnected (read: not yet committed node) when changes are made in an event | Return a node from a change in all cases |
| Maintain a separate DOM for the OM client | Return a live node to the caller |

Moving to decision operation 530, a determination is made as to whether any of the data consumers rejected the original change to the data store.

When the change has been rejected by any of the data consumers, the process moves to block 540, where any changes that were made in response to the change and any side-effect changes that are queued are rolled back as if no change had ever taken place.

When the clients have accepted the original change, the process flows to operation 550, where the change is optionally validated and then the process flows to operation 560 where the original change is committed to the appropriate data store.

The process then moves to operation 570, where the side-effect changes are executed one at a time within the data store. Each side-effect change may then be accepted or rejected by any of the registered clients. When any of the side effect changes are rejected all of the changes that were made are rolled back as if none of the changes were ever made.

The process then moves to an end block and returns to processing other actions.

The following are example code segments that illustrate some of the common functionality exposed via the data store OM:

The first example illustrates adding a stream to the data store:

Dim oStream As CustomXMLPart
Set oStream=Document.XMLStreams.Add oStream.Load ("c:\specSolution.xml")

The second example illustrates locating a data store.

Dim oStream As CustomXMLPart
Set oStream=Document.XMLStreams("http://www.microsoft.com/office/12/specs")

The third example illustrates adding a subtree to a data store.

--- oStream.SelectionNamespaces = oStream.SelectionNamespaces & "xmlns:s='http://www.microsoft.com/office/12/specs'"
oStream.SelectSingleNode("/s:spec/s:specBody/s:issues").AppendSubtree
("<s:issue><s:issueBy/><s:issueDate/><s:issueDesc/></s:issue>")

---

According to one embodiment, the following are exemplary functions that are associated with the API.

Events on CustomXMLNode

Events may occur on CustomXMLNode as well as just the document level.

AfterInsert(NewNode as CustomXMLNode, InUndoRedo as Boolean)

Parameters: NewNode: A CustomXMLNode object corresponding to the node just added to the CustomXMLNode. Note: This node may have children (if a subtree was just added to the document). InUndoRedo: A Boolean returning TRUE if the node was added as part of an Undo/Redo action by the user, FALSE otherwise.

This event fires whenever XML nodes are about to be added to the current document. If the add operation involves a subtree of an XML document being added into the CustomXMLNode, this event is fired once for the topmost node in the change. This event fires once for each change messaged to the data store, so side effects of the change represented by this event also trigger the event.

AfterDelete(OldNode as CustomXMLNode, OldParentNode as CustomXMLNode, OldNextSibling As CustomXMLNode, InUndoRedo as Boolean)

Parameters: OldNode: A CustomXMLNode object corresponding to the node which was just removed from the CustomXMLPart. Note #1: This node may have children (if a subtree is being removed from the document). Note #2: This node will be a 'disconnected' node in that a query may be made down from the node, but cannot go up—it appears to exist alone (i.e. it's a document element w/ the same OwnerStream). OldParentNode: A CustomXMLNode object corresponding to the former parent node of OldNode. OldNextSibling: A CustomXMLNode object corresponding to the former next sibling of OldNode. InUndoRedo: A Boolean returning TRUE if the node was added as part of an Undo/Redo action by the user, FALSE otherwise.

This event fires whenever XML nodes are deleted from the current item in the data store. If the delete operation involves a subtree of the XML document in the CustomXMLPart, fire this event once for the topmost node in the change. This event fires once for each change messaged to the data store, so side effects of the change represented by this event also trigger the event.

AfterReplace(OldNode as CustomXMLNode, NewNode as CustomXMLNode, InUndoRedo as Boolean)

Parameters: OldNode: A CustomXMLNode object corresponding to the node which was just removed from the CustomXMLPart. Note #1: This node may have children (if a subtree is being removed from the document). Note #2: This node will be a 'disconnected' node in that a query may be made down from the node, but does not go up—it appears to exist alone (i.e. it's a document element w/ the same OwnerStream). NewNode: A CustomXMLNode object corresponding to the node just added to the CustomXMLPart. Note: This node may have children (if a subtree was just added to the document). InUndoRedo: A Boolean returning TRUE if the node was added as part of an Undo/Redo action by the user, FALSE otherwise.

This event fires whenever XML nodes are replaced in the data store. If the replace operation involves a subtree of the XML document in the CustomXMLPart, fire this event once for the topmost node in the change. This event fires once for each change messaged to the data store, so side effects of the change represented by this event also trigger the event.

CustomXMLParts( ): Points to the collection of all the data store items available in the file including the OLE document properties and WSS properties streams.

CustomXMLPrefixMappings: Object representing all of the prefix mappings for the current part.

AddNamespace(Prefix As String, NamespaceURI As String) As Void

Parameters: Prefix: A String representing the prefix to add to the prefix mapping list. NamespaceURI: A String representing the namespace to assign to the newly added prefix.

Allows the developer to add a custom namespace/prefix mapping to use when querying this item. If the prefix already exists in the manager, this overwrites the meaning of that prefix except when the prefix is one added/used by the data store internally, then will return an error: "This prefix is already in use and cannot be modified."

Count As Long: Returns the number of prefix mappings in the collection.

Item(Index as Long) As CustomXMLPrefixMapping

Parameters: Index: A Long representing the index of the desired schema in the collection.

Returns the requested CustomXMLPrefixMapping from the collection. Default member of this object.

LookupNamespace(Prefix As String) As String

Parameters: Prefix: A String representing a prefix in the prefix mapping list. Allows the developer to get the namespace corresponding to the specified prefix. If a namespace is not assigned to the requested prefix, returns " ".

LookupPrefix(NamespaceURI As String) As String

Parameters: NamespaceURI: A String representing a namespace in the prefix mapping list.

Allows the developer to get a prefix corresponding to the specified namespace. If a prefix is not assigned to the requested namespace, returns " ". If there are multiple prefixes specified in the namespace manager return the first one that matches the supplied namespace.

CustomXMLPrefixMapping: Object representing a prefix mapping.

Prefix As String: Returns the prefix for this prefix mapping.

NamespaceURI As String: Returns the namespace for this prefix mapping.

CustomXMLSchema: Object representing a schema which is part of a schema collection.

Delete As Void: Deletes this schema from the schema collection. If this is done to a schema in a collection which is already validated or attached to a stream (a live collection of sorts), then fail with an error message: "This schema cannot be deleted, as the schema collection is currently in use."

Location As String: Returns a string which represents the location of this schema on the user's machine.

NamespaceURI As String: Returns the target namespace of this schema, " " if none is specified by the XSD.

Reload As Void: Reloads this schema from disk, which translates to re-touching the copy of this schema on disk to: update its location (if the SL has changed) and ensure it's still a valid schema. If this is done to a schema in a collection which is already validated or tied to a stream (a live collection of sorts), then fail with an error message: "This schema cannot be reloaded, as the schema collection is currently in use."

CustomXMLSchemaCollection( ): Object representing a collection of schemas (which are/will be attached to a stream).

Add([NamespaceURI As String], [Alias As String], [FileName As String], [InstallForAllUsers As Boolean=False]) As CustomXMLSchema Parameters: NamespaceURI: A String representing the namespace of the schema to be added to the collection. If the schema exists in the Schema Library, retrieve it out of there. Alias: A String representing the alias of the schema to be added to the collection. If the alias exists in the SL, find it using this argument. FileName: A String representing the location on disk where the schema can be found. If this parameter is specified, not only add the schema to the collection, add it to the SL. InstallForAllUsers: A Boolean representing whether, in the case where adding the schema to the Schema Library, the SL keys should be written to HKLM (for all users) or HKCU (for just the current user). Defaults to False (writing to HKCU).

This method allows the developer to add one or more schemas to a schema collection to be added to a stream in the data store, as well as to the Schema Library. It can be invoked with the following sets of parameters (in case of conflict, attempt to use the parameters in the following order): [NamespaceURI],[Alias],FileName,[InstallForAllUsers] (adds a schema to the schema library if one doesn't exist for that namespace). Just the NamespaceURI (looks up the XSD from the schema library). Just the Alias (looks up the XSD from the schema library).

AddCollection(SchemaCollection As CustomXMLSchemas( )) As Void

Parameters: SchemaCollection: A CustomXMLSchemas ( ) object representing a collection of schemas to be imported into the current collection.

Adds an already existing collection to the current collection. If namespaces collide during the import (for example, if a.xsd is already linked to "fooNamespace" but the incoming collection has b.xsd for the same namespace), the incoming collection wins.

Count As Long: Returns the number of schemas in the collection.

Item(Index as Variant) As CustomXMLSchema

Parameters: Index: A Variant indicating the desired item in the collection. It can be either of: a String representing the target namespace of the desired schema; or a Long representing the index of the desired schema in the collection.

Returns the requested CustomXMLSchema from the collection. Default member of this object.

NamespaceURI(Index as Long) As String

Parameters: Index: A Long representing the index of the schema in the collection.

Returns the target namespace of the specified member of the schema collection.

Validate As Boolean: Returns a Boolean representing whether the schemas in the collection validated or not. Also this is when the Includes are traversed for each schema in the collection and add them to the schemas which requested them.

CustomXMLParts( ): Collection representing a set of CustomXMLPart objects.

Add([XML As String], [SchemaCollection as CustomXMLSchemaCollection( )]) As CustomXMLPart Parameters: XML: An optional String representing the XML to add to the newly created CustomXMLPart. SchemaCollection: An optional CustomDataSchemaCollection( ) object representing the set of schemas to be used to validate this stream.

Allows the user to add a new CustomXMLPart to the file. If the XML in the XML parameter is not well-formed, fail and throw an error: "To add content to this stream, it must be valid, well-formed XML." If the user provides a SchemaCollection: Validate it (if it hasn't already been validated). Throw any MSXML parsing errors received back to the OM client and fail to add the stream. Check if the XML parameter can be loaded into a DOM. If not, fail and throw an error: "To add content to a stream, it must be valid, well-formed XML." Attach the schema collection to the DOM and try to validate the instance document. If it doesn't validate, fail and throw the XML parsing error received back at the OM client and do not add a stream to the collection.

If the user does NOT provide a SchemaCollection: Check if the XML parameter can be loaded into a DOM. If not, fail and throw an error: "To add content to a stream, it must be valid, well-formed XML." Look at the list of namespaces referenced in the XML file. Find those schemas from the SL and infer a schema collection for them. Try to validate the resulting schema collection. If it doesn't validate, still add the stream to the collection, but it is not associated with any schema collection and is hence not validated. Attach the schema collection to the DOM and try to validate the instance document. If it doesn't validate, fail and throw the XML parsing error received back at the OM client and do not add a stream to the collection. If it doesn't validate, still add the stream to the collection, but it is not associated with any schema collection and is hence not validated. Providing an empty SchemaCollection will be an explicit action that is taken to mean "never validate this stream."

Count As Long: Returns the number of custom data streams in the collection.

Item(Index As Variant) As CustomXMLPart

Parameters: Index: A Variant, which can be one of the following two types: a Long representing the index of the desired CustomXMLPart in the collection; or a String representing the root namespace of the desired CustomXMLPart in the collection. If more than one part matches this root namespace, the first match in index order will be returned.

This is the default member of the CustomXMLParts object, and it returns a CustomXMLPart object corresponding to the requested object.

SelectByID(ID As String) As CustomXMLPart

Parameters: ID: A String containing the ID for the data store item which should be returned from the collection.

Allows the developer to grab a specific item from the data store using its ID. If a store item with this ID does not exist, returns Nothing.

SelectByNamespace(NTamespaceURI As String) As CustomXMLParts( )

Parameters: NamespaceURI: A String representing the root namespace of the desired items from the data store's collection.

Returns all of the data store items whose root namespace matches the requested entry. If no streams with this root namespace exist, returns an empty CustomXMLParts( ) collection.

StreamAfterAdd(NewStream As CustomXMLPart)

Parameters: NewStream: A CustomXMLPart object contained the stream that was just added.

This event fires whenever a new stream is added to the data store. If multiple streams are added, the event fires once for each new stream. If the stream was added with XML content (using the appropriate .Add method), then this event should not fire until the item is populated with that content.

StreamBeforeDelete(OldStream As CustomXMLPart)

Parameters: OldStream: A CustomXMLPart object contained the stream that is about to be deleted from the data store.

This event fires whenever a stream is removed from the data store. If multiple streams are removed, the event fires once for each stream that was deleted. Also flag this stream as 'about to be deleted' such that read-only operations on it are valid (e.g. querying for nodes, checking values, etc.) but write operations fail with an error message: "This operation cannot be performed on a stream that is about to be deleted."

CustomXMLPart: Object representing a single XML stream in the data store.

AddNode([Name As String], [NamespaceURI As String], Parent As CustomXMLNode, [NextSibling As CustomXMLNode],[NodeType As msoCustomXMLNodeType],[NodeValue As String]) As Void Parameters: Name: A String that represents the base name of the node to be added to the XML DOM. Namespace: An optional String that represents the namespace of the node to be added to the XML DOM. Required to add nodes of type msoCustomXMLNodeElement or msoCustomXMLNodeAttribute, ignored otherwise. Parent: A CustomXMLNode representing the node under which this node should be added. If adding an attribute, denotes the element that the attribute should be added to. NextSibling:An optional CustomXMLNode representing the node which should become the next sibling of the new node. If not specified, the node is added to the end of the parent node's children. Ignored for additions of type msoXMLNodeAttribute. If NextSibling is not a child of parent, return an error: "This node cannot be added because the next sibling node is not a child of the parent node." NodeType: An optional msoCustomXMLNodeType that specifies the type of node to create. If not specified, then assumed to be msoCustomXMLNodeElement. NodeValue: An optional String which is used to set the value of the node for nodes which allow text. If the node doesn't allow text, the parameter is ignored.

A generic method for adding an XML node to a data store item. Parent is required and NodeType defaults to msoXMLNodeElement. If the resulting addition would be structurally invalid, fail with an error message: "This operation cannot be performed because it would result in a structurally invalid data stream." If the namespace is not in the schema references collection, fail and provide error message: "To add this element, you must first attach its schema to the data stream."

DocumentElement As CustomXMLNode

Gets the root element of the stream. If the stream is empty, returns Nothing.

Delete As Void: Deletes the current CustomXMLPart from the data store. If the user attempts to delete the core properties part, fails with: "This custom XML part is required for Office to function properly and cannot be deleted."

ID As String: Returns a string containing the GUID assigned to the current CustomXMLPart.

Load(FilePath As String) As Boolean

Parameters: FilePath: A String object corresponding to the file on the user's machine (or network, etc.) from which the XML for this CustomXMLPart should be loaded.

Allows the template author to populate a CustomXMLPart from a previously existing file on their machine. Returns TRUE if the load was successful, FALSE if not (which includes the case where structure enforcement is turned on and the XML is structurally invalid or the case where the XML was not valid and/or well-formed). Once the DOM is loaded, fails with "This DOM cannot be loaded twice."

LoadXML(XML As String) As Boolean

Parameters: XML: A String object corresponding to the XML with which this CustomXMLPart should be loaded.

Allows the template author to populate a CustomXMLPart from a string of XML. Returns TRUE if the load was successful, FALSE if not (which includes the case where structural enforcement is turned on and the XML is structurally invalid or the case where the XML is not valid and/or well-formed). Once the DOM is loaded, fails with "This DOM cannot be loaded twice."

NamespaceURI As String: Returns a string containing the full namespace URI for the root node of the current CustomXMLPart. If the stream is empty (created but no nodes added), returns " ".

SchemaCollection As CustomXMLSchemaCollection( ): Gets/sets a CustomXMLSchemaCollection( ) collection representing the set of schemas attached to this stream. If the user provides a SchemaCollection: validate it (if it hasn't already been validated). Throw any parsing errors received back to the client and fail to add the stream; and attach the schema collection to the DOM and try to validate the instance document. If it doesn't validate, fail and throw the parsing error received back at the client and do not change the schema collection on the stream.

NamespaceManager As CustomXMLPrefixMappings( )

Gets the set of namespace prefix mappings used against the current CustomXMLPart. When the document is opened, this is automatically populated with the contents of the prefix mappings embedded in the data store item, but it can be edited/added to/deleted from by the template author. According to one embodiment, changes to this parameter are not saved with the document, however.

SelectNodes(XPath As String) As CustomXMLNodes( )

Parameters: XPath: A String containing the XPath expression to evaluate against the DOM. The prefix mappings for this XPath are retrieved from the associated namespace manager. If the XPath doesn't resolve, pass through whatever error was generated.

This method allows the developer to get back a set of nodes from within the DOM.

SelectSingleNode(XPath As String) As CustomXMLNode

Parameters: XPath: A String containing the XPath expression to evaluate against the DOM. The prefix mappings for this XPath are retrieved from the associated namespace manager. If the XPath doesn't resolve, pass through whatever error was generated.

This method allows the developer to get back a single node from within the DOM.

XML As String: Returns the XML representation of the current CustomXMLPart.

NodeAfterInsert(NewNode as CustomXMLNode, InUndoRedo as Boolean)

Parameters: NewNode: A CustomXMLNode object corresponding to the node just added to the CustomXMLPart. Note: This node may have children (if a subtree was just added to the document). InUndoRedo: A Boolean returning TRUE if the node was added as part of an Undo/Redo action by the user, FALSE otherwise.

This event fires whenever XML nodes are about to be added to the current document. If the add operation involves a subtree of XML document being added into the CustomXMLPart, fire this event once for the topmost node in the change. This event fires once for each change messaged to the data store, so side effects of the change represented by this event also trigger the event.

NodeAfterDelete(OldNode as CustomXMLNode, OldParentNode as CustomXMLNode, OldNextSibling As CustomXMLNode, InUndoRedo as Boolean).

Parameters: OldNode: A CustomXMLNode object corresponding to the node which was just removed from the CustomXMLPart. Note #1: This node may have children (if a subtree is being removed from the document). Note #2: This node will be a 'disconnected' node in that a query can be made down from the node, but does not go up—it appears to exist alone (i.e. it's a document element w/the same OwnerStream). OldParentNode: A CustomXMLNode object corresponding to the former parent node of OldNode. OldNextSibling: A CustomXMLNode object corresponding to the former next sibling of OldNode. InUndoRedo: A Boolean returning TRUE if the node was added as part of an Undo/Redo action by the user, FALSE otherwise.

This event fires whenever XML nodes are deleted from the current item in the data store. If the delete operation involves a subtree of the XML document in the CustomXMLPart, fire this event once for the topmost node in the change. This event fires once for each change messaged to the data store, so side effects of the change represented by this event also trigger the event.

NodeAfterReplace(OldNode as CustomXMLNode, NewNode as CustomXMLNode, InUndoRedo as Boolean)

Parameters: OldNode: A CustomaXMLNode object corresponding to the node which was just removed from the CustomXMLPart. Note #1: This node may have children (if a subtree is being removed from the document). Note #2: This node will be a 'disconnected' node in that a query can be made down from the node, but cannot go up—it appears to exist alone (i.e. it's a document element w/the same OwnerStream). NewNode: A CustomXMLNode object corresponding to the node just added to the CustomXMLPart. Note: This node may have children (if a subtree was just added to the document). InUndoRedo: A Boolean returning TRUE if the node was added as part of an Undo/Redo action by the user, FALSE otherwise.

This event fires whenever XML nodes are replaced in the data store. If the replace operation involves a subtree of the XML document in the CustomXMLPart, this event is fired once for the topmost node in the change. This event fires once for each change messaged to the data store, so side effects of the change represented by this event also trigger the event.

CustomXMLNodes( ): A collection representing a set of CustomXMLNode objects in the current document.

Count As Long: Returns the number of CustomXMLNodes in the collection.

Item(Index as Long) As CustomXMLNode

Parameters: Index: A Long representing the index of the desired CustomXMLNode in the collection.

This is the default member of the CustomXMLNodes object, and it returns an CustomXMLNode object corresponding to the requested item in the collection.

CustomXMLNode

AppendChildNode([Name As String], [NamespaceURI As String], [NodeType As msoCustomXMLNodeType], [NodeValue As String]) As Void Parameters: Name: An optional String that represents the base name of the element to be added to the XML DOM. Namespace: An optional String that represents the namespace of the element to be added to the XML DOM. Required to add nodes of type msoCustomXMLNodeElement or msoCustomXMLNodeAttribute, ignored otherwise. NodeType: An optional msoCustomXMLNodeType that specifies the type of node to create. If not specified, assumed to be msoCustomXMLNodeElement. NodeValue: An optional String which is used to set the value of the node for nodes which allow text. If the node doesn't allow text, the parameter is ignored.

Allows the developer to add a single node as the last child under the context element in the tree, if the context node is of type msoXMLNodeElement. If it is not, then the method fails with an error: "You cannot append children to comments, processing instructions, or attributes." Also block any case where the node that would be added is an attribute that already exists: "An attribute of the same name already exists on the current element."

AppendChildSubtree(XML As String) As Void

Parameters: XML: A String representing the subtree to add to the XML DOM. This XML must be a well-formed XML document (incl. namespace declarations, single root node, etc.). If it is not, fail with an error: "To add an XML subtree to your document, it must contain valid, well-formed XML."

Allows the developer to add an existing well-formed XML subtree as the last child under the context element in the DOM, if the context node is of type msoXMLNodeElement. If it is not, then the method fails with an error: "You cannot append children to comments, processing instructions, or attributes."

Attributes As CustomXMLNodes( ): Returns a CustomXMLNodes collection representing the attributes on the current element.

BaseName As String: This is the default member of CustomXMLNode. It returns the base name of the node without the namespace prefix, if one exists in the DOM.

ChildNodes As CustomXMLNodes: Returns a CustomXMLNodes collection which contains all of the elements which are children of the current node.

Delete As Void: Deletes the current node from the XML DOM (including all of its children, if any). If the resulting deletion would be structurally invalid, fail with an error message: "This operation cannot be performed because it would result in a structurally invalid DOM."

FirstChild As CustomXMLNode: Returns a CustomXMLNode object corresponding to the first child element of the current node. If the node has no element children (or if it isn't of type msoCustomXMLNodeElement itself), returns Nothing.

HasChildNodes As Boolean: Returns a Boolean that is True if the current node has child element nodes, False otherwise. This will return false when CustomXMLNode isn't of NodeType msoCustomXMLNodeElement.

InsertNodeBefore([Name As String], [NamespaceURI As String], [NodeType As msoCustomXMLNodeType], [NodeValue As String], [NextSibling as CustomXMLNode]) As Void Parameters: Name: A String that represents the base name of the element to be added to the XML DOM. Namespace: An optional String that represents the namespace of the element to be added to the XML DOM. Required to add nodes of type msoCustomXMLNodeElement or msoCustomXMLNodeAttribute, ignored otherwise. NodeType: An optional msoCustomXMLNodeType that specifies the type of node to create. If not specified, assumed to be msoCustomXMLNodeElement. NodeValue: An optional String which is used to set the value of the node for nodes which allow text. If the node doesn't allow text, the parameter is ignored. NextSibling: An optional CustomXMLNode object that specifies the node before which the new XML element should be added to the tree.

Inserts a new child node into the tree at the specified location. If BeforeNode is not present when adding a node of type msoCustomXMLNodeElement, msoCustomXMLNodeComment, or msoCustomXMLNodeProcessingInstruction, the node is added to the end of the list. If added for type msoCustomXMLNodeAttribute, it is ignored. If NextSibling is not a child of the context node, then the method fails with: "This XML node cannot be added because the next sibling element must be a child of the context element." If the resulting addition would be structurally invalid (and schema enforcement is turned on) fail with an error message: "This operation cannot be performed because it would result in a structurally invalid DOM." Also block any case where the node that would be added is an attribute that already exists: "An attribute of the same name already exists on the current element."

InsertSubtreeBefore(XML As String, [NextSibling as CustomXMLNode]) As Void

Parameters: XML: A String representing the subtree to add to the XML DOM. This XML must be a well-formed XML document (incl. namespace declarations, single root node, etc.). If it is not, fail with an error: "To add an XML subtree to your document, it must contain valid, well-formed XML." NextSibling: An optional CustomXMLNode object that specifies the node before which the new XML element should be added to the tree.

Inserts the specified XML subtree into the child nodeset at the specified location. If NextSibling is not a child of the context node, then the method fails with: "This XML node cannot be added because the next sibling must be a child of the context element." If the resulting addition would be structurally invalid, fail with an error message: "This operation cannot be performed because it would result in a structurally invalid DOM."

LastChild As CustomXMLNode: Returns a CustomXMLNode object corresponding to the last child element of the current node. If the node has no child elements (or if it isn't of type msoCustomXMLNodeElement itself), returns Nothing.

NamespaceURI As String [read-only]

Returns a String corresponding to the namespace of the current node. If the node is of type msoCustomXMLNodeComment msoCustomXMLNodeProcessingInstruction, returns " ".

NextSibling As CustomXMLNode: Returns the next sibling node (element, comment, or processing instruction) of the current node. If the node is the last sibling at its level, returns Nothing.

NodeType As msoCustomXMLNodeType: Returns a msoCustomXMLNodeType constant representing the type of the current node.

NodeValue As String: Gets/sets the text inside of nodes contain just text (i.e. text nodes, comments, processing instructions, attributes). For elements, fails with: "You cannot set the NodeValue parameter for element nodes."

OwnerDocument As Variant: Returns the Document/Workbook/Presentation object representing the Word document associated with this node.

OwnerStream As CustomXMLPart: Returns the CustomXMLPart object representing the data store item associated with this node.

PreviousSibling As CustomXMLNode: Returns the previous sibling node (element, comment, or processing instruction) of the current node. If the node is the first sibling at its level, returns Nothing.

ParentNode As CustomXMLNode: Returns the parent element node of the current node. If the node is at the root level, returns Nothing.

RemoveChild(Child As CustomXMLNode) As Void

Parameters: Child: A CustomXMLNode object that represents the child node of the context node to be deleted. If this node is not a child of the context node, fail with the error message: "This node cannot be removed because it is not a child of the current element."

Removes the specified child node from the stream. If the resulting DOM would be structurally invalid, fail with an error message: "This operation cannot be performed because it would result in a structurally invalid DOM."

ReplaceChildNode(Name As String, [Namespace As String], [NodeType As msoCustomXMLNodeType], [NodeValue As String], OldNode As CustomXMLNode) As Void Parameters: OldNode: A CustomXMLNode representing the child node to be replaced. Name: A String that represents the base name of the element to be added to the XML DOM. Namespace: An optional String that represents the namespace of the element to be added to the XML DOM. Required to add nodes of type msoCustomXMLNodeElement or msoCustomXMLNodeAttribute, ignored otherwise. NodeType: An optional msoCustomXMLNodeType that specifies the type of node to create. If not specified, assumed to be msoCustomXMLNodeElement. NodeValue: An optional String which is used to set the value of the node for nodes which allow text. If the node doesn't allow text, the parameter is ignored.

Removes the specified child node (and its subtree) from the stream, and replaces it with the node specified in the same location. If the OldNode is not a child of the context node, fail with an error message: "OldNode must be a child of the current node." If the resulting replacement would be structurally invalid, fail with an error message: "This operation cannot be performed because it would result in a structurally invalid DOM." Also block any case where the node that would be added is an attribute that already exists: "An attribute of the same name already exists on the current element."

ReplaceChildSubtree(XML As String, OldNode As CustomXMLNode) As Void

Parameters: OldNode: A CustomXMLNode representing the child node to be replaced. XML: A String representing the subtree to add to the XML DOM. This XML must be a well-formed XML document (incl. namespace declarations, single root node, etc.). If it is not, fail with an error: "To add an XML subtree to your document, it must contain valid, well-formed XML."

Removes the specified node (and its subtree) from the stream, and replaces it in the same location with the XML subtree specified. If the OldNode is not a child of the context node, fail with an error message: "OldNode must be a child of the current node." If the resulting replacement would be structurally invalid, fail with an error message: "This operation cannot be performed because it would result in a structurally invalid DOM."

SelectNodes(XPath As String) As CustomXMLNodes( )

Parameters: XPath: A String containing the XPath expression to evaluate against the DOM. The prefix mappings for this XPath are retrieved from the NamespaceManager property. If the XPath doesn't resolve, pass through whatever error there was (a la this method on the Document object today with embedded XML).

This method allows the developer to get back a set of nodes from within the data store item.

SelectSingleNode(XPath As String) As CustomXMLNode( )

Parameters: XPath: A String containing the XPath expression to evaluate against the DOM. The prefix mappings for this XPath are retrieved from the NamespaceManager property. If the XPath doesn't resolve, pass through whatever error there was (a la this method on the Document object today with embedded XML).

This method allows the developer to get back a single node from within the data store item.

Text As String: Gets/sets the text for the current node. Unlike MSXML, setting this on a node replaces the contents of that node with the specified string—for example, setting it to "test" on a non-leaf element <foo> where foo's contents look like:

```
<foo>
    Bar
    <baz>hello</baz>
</foo>
```

Will not fail, but it will result in a different message internally to the data store, and externally to the clients of the data store. If the resulting replacement would be structurally invalid, fail with an error message: "This operation cannot be performed because it would result in a structurally invalid DOM."

XML As String: Returns the raw XML representation of the current node and its children (if any).

XPath As String: Returns a String with the canonicalized XPath for the current node. If the node is no longer in the DOM (it was deleted), fails with: "This node has been deleted from the associated custom XML part."

New Enums:

msoCustomXMLDataNodeType represents the types of XML nodes available msoCustomXMLNodeAttribute represents an XML attribute node.

msoCustomXMLNodeCData represents a CDATA node.

msoCustomXMLNodeComment represents an XML comment node.

msoCustomXMLNodeDocument represents an XML document (/) node.

msoCustomXMLNodeElement represents an XML element node.

msoCustomXMLNodeProcessingInstruction represents an XML processing instruction node. msoCustornXMLNodeText represents a text node.

ReplaceChild(Child As CustomXMLNode, Name As String, [Namespace As String], [NodeType As String], [NodeValue As String]) As CustomXMLNode Parameters: Child: A CustomXMLNode object that represents the child node of the context node to be deleted. If this node is not a child of the context node, fail with the error message: "This node cannot be removed because it is not a child of the current element." Name: A String that represents the base name of the element to be added to the XML DOM. Namespace: An optional String that represents the namespace of the element to be added to the XML DOM. Required to add nodes of type msoXMLNodeElement or msoXMLNodeAttribute, ignored otherwise. NodeType: An optional msoXMLNodeType that specifies the type of node to create. If not specified, assumed to be msoXMLNodeElement. NodeValue: An optional String which is used to set the value of the node for nodes which allow text. If the node doesn't allow text, the parameter is ignored.

Removes the specified child node (and its subtree) from the stream, and replaces it with the node specified in the same location. If the resulting deletion would be structurally invalid (and schema enforcement is turned on) fail with an error message: "This operation cannot be performed because it would result in a structurally invalid DOM."

XMLNamespace: The object representing a single unique namespace in the Schema Library.

AttachToCustomXMLPart(CustomXMLPart As Variant) As Void

Parameters: CustomXMLPart: A Variant, which can be either the CustomXMLPart object for the desired stream, or the index of that steam in the CustomXMLParts collection.

Attaches the schema for this XML namespace to the given CustomXMLPart.

XMLSchemaReference: The object representing a single unique namespace referenced in the current document.

Delete( ) As Void: Removes the namespace—as well as all elements in that namespace—from the CustomXMLPart. However, in this case the data store may reject this operation because structural schema enforcement is enabled and removing these elements would result in a structurally invalid DOM. In this case, fail and throw an error: "This operation cannot be performed while schema enforcement is enabled, because the resulting stream would be structurally invalid."

Add(Name As String, Namespace As String, [Parent As CustomXMLNode], [NextSibling As CustomXMLDataNode],[NodeType As msoXMLNodeType],[NodeValue As String]) As CustomXMLNode Parameters: Name: A String that represents the base name of the element to be added to the XML DOM. Namespace: An optional String that represents the namespace of the element to be added to the XML DOM. Required to add nodes of type msoXMLNodeElement or msoXMLNodeAttribute, ignored otherwise. Parent: An optional CustomXMLNode representing the node under which this node should be added. If called off of the CustomXMLNodes collection returned by the Attributes property, then assumed to be the parent node of the attributes. If called in any other case, then this parameter is specified or returns an error: "You must specify a parent node to add this node to your document." NextSibling:An optional CustomXMLNode representing the node which should become the next sibling of the new node. If not specified, the node is added to the end of the parent node's children. Ignored for additions of type msoXMLNodeAttribute. If NextSibling is not a child of parent, return an error: "This node cannot be added because the next sibling node is not a child of the parent node." NodeType: An optional msoXMLNodeType that specifies the type of node to create. If not specified, assumed to be msoXMLNodeElement unless called off of the Attributes property, then assumed to be msoXMLNodeAttribute. NodeValue: An optional String which is used to set the value of the node for nodes which allow text. If the node doesn't allow text, the parameter is ignored.

A generic method for adding an XML node to a data store item. If called off of an CustomXMLNodes object returned by the Attributes property, then the Parent has a default of the parent node and the NodeType has a default of msoXMLNodeAttribute. In all other cases, Parent is required and NodeType defaults to msoXMLNodeElement. If the resulting addition would be structurally invalid (and schema enforcement is turned on) fail with an error message: "This operation cannot be performed while schema enforcement is turned on, because it would result in a structurally invalid data stream." If the namespace is not in the schema references collection, fail and error message: "To add this element, you must first attach its schema to the data stream."

CustomDataXMLSchemaReferences( ): Collection representing all of the unique namespaces identified in the CustomXMLPart. Note: By default, populate this with an entry for each namespace declared in the XML file.

Add([NamespaceURI As String],[Alias As String],[FileName As String],[InstallForAllUsers As Boolean=False]) As XMLSchemaReference Parameters: NamespaceURI: A String containing the namespace defined by the schema to add to the schema collection. Alias: A String containing an alias to write when adding this schema to the schema library. FileName: A String containing the path to the schema that should be added to the schema library. InstallForAllUsers: A Boolean determining whether the Schema Library keys should be added to HKCU (the default) or HKLM This method adds a schema reference. To do this, add the appropriate namespace declaration to the root element of the CustomXMLPart if it is not already defined in the file. At open time, all declared namespaces are used to populate this collection.

EnforceStructure As Boolean: Gets and sets a Boolean which corresponds to whether the data store should enforce structural validity on the associated CustomXMLPart according to its schema. If the user attempts to set this property to TRUE while the contents of the CustomXMLPart are not valid, return an error: "Schema enforcement cannot be turned on while the contents of this data stream are structurally invalid."

Count As Long: Returns the number of namespaces currently referenced in this CustomXMLPart.

Item(Index As Variant) As XMLSchemaReference

Parameters: Index: A Variant, which can be one of the following two types: A Long representing the index of the desired CustomDataXMLSchemaReference in the collection; and a String representing the namespace of the desired CustomDataXMLSchemaReference in the collection.

This is the default member of the CustomDataXMLSchemaReferences object, and it returns an XMLSchemaReference object corresponding to the requested object.

Validate( ) As Void: This method validates the entire stream against all schemas in the CustomDataXMLSchemaReferences collection. Errors are reported on the individual nodes (see the ValidationStatus property)/

CustomXMLNode

NodeAfterInsert(NewCustomXMLNode as CustomXMLNode, InUndoRedo as Boolean).

Parameters: NewCustomXMLNode: A CustomXMLNode object corresponding to the node just added to the CustomXMLPart. Note: This node may have children (if a subtree was just added to the document). InUndoRedo: A Boolean returning TRUE if the node was added as part of an Undo/Redo action by the user, FALSE otherwise.

This event fires whenever XML nodes are about to be added to the current document. If the add operation involves a subtree of XML document being added into the CustomXMLPart, fire this event once for the topmost node in the change. This event fires once for each change messaged to the data store, so side effects of the change represented by this event also trigger the event.

NodeBeforeDelete(OldCustomXMLNode as CustomXMLNode, InUndoRedo as Boolean)

Parameters: OldCustomXMLNode: A CustomXMLNode object corresponding to the node about to be removed from the CustomXMLPart. Note: This node may have children (if a subtree is being removed from the document). InUndoRedo: A Boolean returning TRUE if the node was added as part of an Undo/Redo action by the user, FALSE otherwise.

This event fires whenever XML nodes are deleted from the current item in the data store. If the delete operation involves a subtree of the XML document in the CustomXMLPart, fire this event once for the topmost node in the change. This event fires once for each change messaged to the data store, so side effects of the change represented by this event also trigger the event. If the event handler tries to modify anything that would be under this node, fail with an error message: "This change is not allowed because this node is about to be deleted."

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A tangible computer-readable storage medium having computer-executable instructions for managing data associated with computer-generated documents, comprising:
    storing structured data items that are associated with a document in a data store that is maintained separately from document data for the document; wherein the document data defines a primary presentation for displaying the document; wherein the structured data items are represented by Extensible Markup Language (XML); wherein the structured data items are metadata for the document; wherein the structured data items remain associated with the document until the structured data items are removed from the data store; and
    formatting the structured data such that an application programming interface (API) is exposed to a plurality of different client data consuming applications for allowing programmatic access to the structured data items by each of the data consuming applications; wherein execution of the API provides the ability to access the structured data items within the data store while the document is open for editing and when the document is closed for editing; wherein the API that allows the programmatic access to the structured data items by the data consuming applications comprises allowing the plurality of data consuming applications to access a same structured data item at the same time; wherein the API allows any of the data consuming applications to store structured data items within the data store; and
    registering for notification of changes by the data consuming applications;
    determining when a change is made to one of the structured data items using the API; and when a change is made, notifying the registered data consuming applications of the change;
    in response to the notification of the change, queuing a side-effect change by one of the data consuming applications, wherein the side-effect change is generated based on data related to the notified change; and
    notifying the registered data consuming applications of the side-effect change.

2. The tangible computer-readable storage medium of claim 1, further comprising rolling back the change when one of the registered data consuming application rejects the change and committing the change to the data store when each of the registered data consuming application accepts the change.

3. The tangible computer-readable storage medium of claim 2, further comprising using the API to associate the structured data item with an XML schema file that is used to validate the structured data item before the change is committed to the data store.

4. The tangible computer-readable storage medium of claim 1, wherein the API provides a function to register to receive notification for a change notification to at least one of: a change to the data store and a change to one or more of the structured data items; wherein the change includes at least one of: a deletion, an addition, and a modification to at least one of the data store and the structured data item.

5. The tangible computer-readable storage medium of claim 4, wherein the API provides an interface for adding a node to the data store; deleting a node from the data store; and replacing a node within the data store.

6. The tangible computer-readable storage medium of claim 4, wherein the API provides an interface for populating the data store using an existing file; and populating the data store using a string of XML.

7. The tangible computer-readable storage medium of claim 4, wherein the API provides an interface for adding a namespace; looking up a namespace; adding a schema; deleting a schema; and reloading a schema.

8. The tangible computer-readable storage medium of claim 4, wherein the API provides an interface for adding a stream; removing a stream; adding a subtree; removing a subtree; obtaining a next sibling of a current node; and obtaining a previous sibling of a current node obtaining a node type.

9. The tangible computer-readable storage medium of claim 4, wherein the API provides an interface for obtaining a node value; and enforcing a structure.

10. A computer-implemented method for managing data associated with computer-generated documents, comprising:
    storing structured data items that are associated with a document using data stores; wherein the structured data item is structured according to the Extensible Markup Language (XML); wherein the structured data items are metadata for the document; wherein the structured data items remain associated with the document until the structured data items are removed from the data stores; and
    formatting the structured data such that an application programming interface (API) is exposed to a data consuming application that allows programmatic access to the document and to the structured data items that are contained within the data stores; and
    executing the API to access the structured data items within the data stores both while the document is being edited and when the document is closed for editing such that the structured data is linked to the documents and functions as metadata describing characteristics of the document; and wherein the data consuming application receives a notification for a change that is made to the data stores when they are registered;
    initiating a change to one of the data stores using the API;
    providing the notification to a second registered data consuming application relating to the change;
    in response to the notification at the second registered data consuming application, queuing a side-effect change;
    determining when a response from the second registered data consuming application is a rejection, and when the response is a rejection rolling back the change and the side-effect change;

determining when the first and second registered data consuming application accept the change and the side-effect change; and when the first and second registered data consuming application accept the change and the side-effect change; optionally validating the change and the side-effect change using an XML schema file that is provided by one of the data consuming applications through an API; and committing the change and the side-effect change to one or more of the data stores.

11. The computer-implemented method of claim 10, wherein using the API further comprises providing a programming interface for: obtaining a value for a node; adding a node; deleting a node; moving a node; adding a schema; deleting a schema; reloading a schema; adding a namespace; and removing a namespace.

12. A system for managing data associated with computer-generated documents, comprising:

a processor;

a tangible storage medium coupled to the processor;

data consuming applications configured to be executed on the processor;

a document data store that is configured to store documents on the tangible storage medium; and a data store coupled to the data consuming applications that is configured to store structured data items that are associated with one or more of the documents; wherein the structured data items remain associated with the one or more documents until the structured data items are removed from the data store; wherein the data stores includes:

XML data stores;

an API broker that is configured to interact with the data consuming applications;

a change store that is configured to store changes that are associated with a change that is made to a structured data item; and an undo store that is configured to roll back any changes made as a result of the change that is made to the structured data item; wherein the API broker exposes a programming interface (API) that allows programmatic access to the documents and to the structured data item that are contained within the data stores; and wherein the data consuming application is configured to execute the API to access the structured data items within the data stores both while the document is open and when the document is closed such that the API provides a programmatic link to the data consuming application to link items within the data store to the document and wherein the data consuming application is further configured to queue a side-effect change when an item within the data store to the document is changed.

13. The system of claim 12, wherein the data store is further configured to:

receive a change to an Extensible Markup Language (XML) markup data applied to the structured data item;

read an XML schema file associated with the structured data item to which the change to the XML markup data is directed;

determine whether the change to the XML markup data is valid according to the read XML schema file; and disallow the change to the XML markup data if the change to the XML markup data is not valid according to the read XML schema file; and commit the change to one or more the XML stores when the change to the XML markup data is valid according to the read XML schema file.

14. The system of claim 12, wherein each of the XML data stores comprise an undo store and a change store.

15. The system of claim 12, wherein the API provides an interface for adding a node to the data store; deleting a node from the data store; replacing a node within the data store; and obtaining a value from the data store.

16. The system of claim 15, wherein the API provides an interface for adding a schema; deleting a schema; and reloading a schema.

* * * * *